Figure 1:
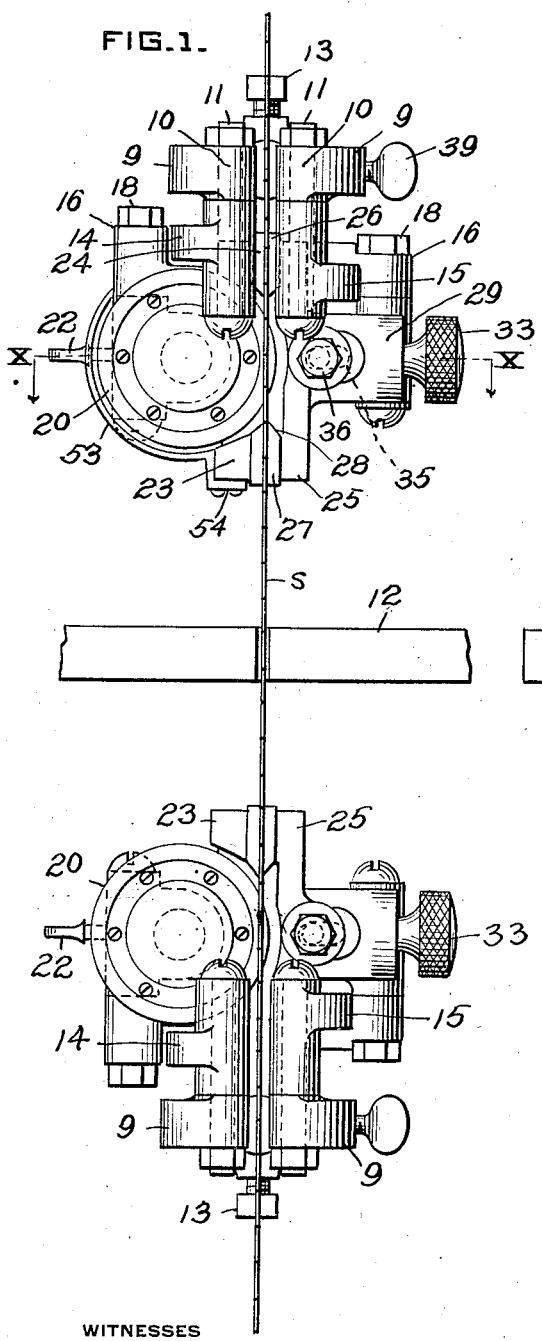

E. NEWELL.
BAND SAW GUIDE.
APPLICATION FILED AUG. 8, 1918.

1,374,600.

Patented Apr. 12, 1921.
2 SHEETS—SHEET 1.

WITNESSES
J. Herbert Bradley

INVENTOR
Edgar Newell

E. NEWELL.
BAND SAW GUIDE.
APPLICATION FILED AUG. 8, 1918.

1,374,600.

Patented Apr. 12, 1921.
2 SHEETS—SHEET 2.

WITNESSES
J. Herbert Bradley

INVENTOR
Edgar Newell
by Geo. Strum
atty.

UNITED STATES PATENT OFFICE.

EDGAR NEWELL, OF IRWIN, PENNSYLVANIA.

BAND-SAW GUIDE.

1,374,600. Specification of Letters Patent. Patented Apr. 12, 1921.

Application filed August 8, 1918. Serial No. 248,973.

*To all whom it may concern:*

Be it known that I, EDGAR NEWELL, a citizen of the United States, and a resident of Irwin, in the county of Westmoreland and State of Pennsylvania, have made a new and useful Invention in Band-Saw Guides, of which the following is a specification.

This invention relates to band saw guides and more particularly to improvements in the guide illustrated and described in Letters Patent No. 1,086,074 issued to Atwood M. Newell and me on February 3, 1914.

In the operation of devices like those of said patent it has been found among other things that the guiding disk for the back edge of the saw was difficult to keep lubricated. It was found that on account of the construction it was necessary to raise the guide a considerable distance above the work in order not to obstruct the operator's view of the line being followed and it was found that the lower guide (that is the one used below the work support or table) had a tendency to clog from the chips or dust passing through the table. An object of this invention is to improve said device so that the operator can keep the guide close to the work without obstructing his view of the line which he is following: to provide a device which is less sensitive to side pressure, so that in sawing long sweeps the saw may be more easily controlled; to provide an improved lower guide which reduces to a minimum the chances for chips to wedge and prevent the guide from swinging; to provide an improved device in which all the parts are easily accessible and more easily repaired, and further to provide an improved back guide or thrust disk for the saw which will prevent the necessity of constant lubrication and attention and which when worn may be reversed so as to present a new bearing face to the saw.

These, as well as further objects which will readily appear to those skilled in this particular art, I attain in the device described in the specification and illustrated in the drawings accompanying and forming a part of this application and throughout which similar elements are denoted by like characters.

Figure 2:
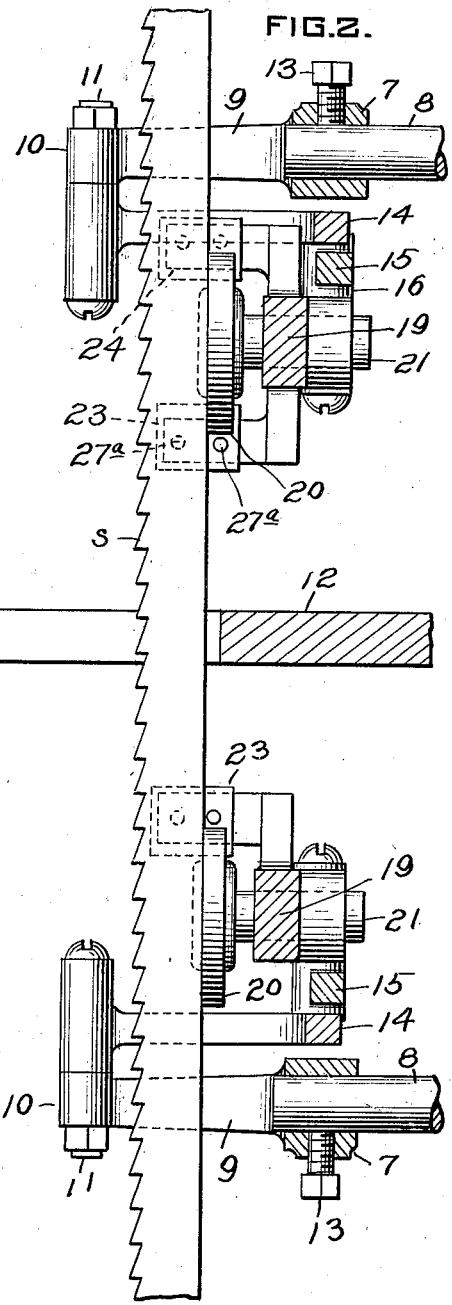
Figure 3:
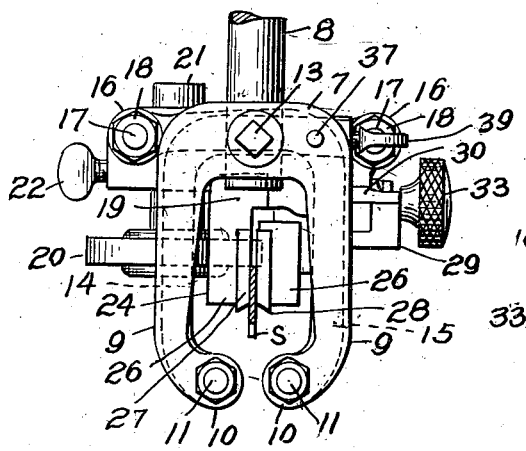
Figure 4:
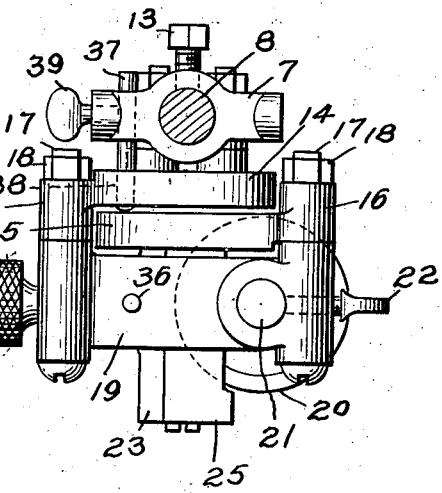
Figure 5:
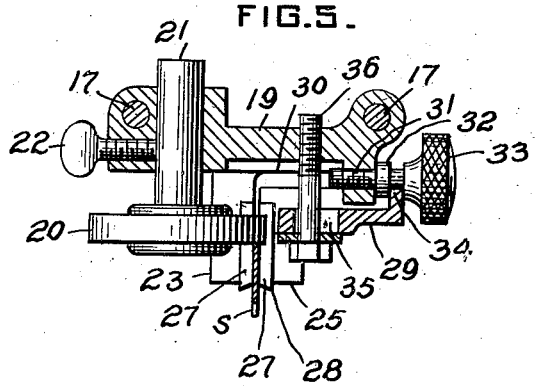
Figure 6:
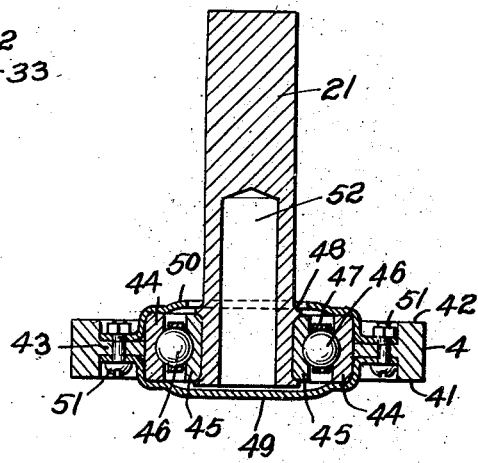

In the drawings, Figure 1 is a front view in elevation of an upper and lower guide embodying this invention, adapted to co-operate in forming a guide unit, Fig. 2 is a side view partially in elevation and partially in section of the unit shown in Fig. 1, Fig. 3 is a top plan view of the upper guide illustrated in Figs. 1 and 2, Fig. 4 is a view in elevation looking toward the back of the upper guide illustrated in Fig. 1, Fig. 5 is a sectional view taken on line XX looking in the direction of the arrow, and Fig. 6 is a detail view in section of the guide or thrust disk and its spindle.

The device consists of a support member 7 socketed to receive a support stud or arm 8 and provided with forwardly extending forks 9 arranged on opposite sides of the path of travel of saw S. The forward bosses 10 of forks 9 are threaded to receive vertical hinge pins 11. Support member 7 is rigidly fixed in proper position with relation to the work table or support 12 by means of a set screw 13.

Mounted on each of said hinge pins is a backwardly extending arm, and these arms, numbered 14 and 15, are arranged one above the other and extend to the rear of the saw path where they cross one another. The rear end of each crossed arm is provided with a boss 16 threaded to receive a hinge pin 17 rigidly held in place in said boss by means of a lock nut 18.

Mounted to swing on hinge pin 17 is a support member 19 which carries (in the case of the upper guide member) two pairs of saw guide jaws located on opposite sides of the axis of a guide disk 20 for the back of the saw. Guide disk 20 is mounted on a spindle 21 by means of a ball bearing and said spindle, slidably mounted within a socket formed for its reception in support member 19, is locked in adjusted position by means of set screw 22. The saw guide jaws are made up of fixed jaws 23 and 24 and adjustable jaws 25 and 26. Each jaw is provided with a hardened steel wear plate 27. These wear plates are removably secured to the jaws by means of screws 27$^a$ and each at its forward end is beveled as shown at 28. The oppositely disposed bevels—if the saw for any reason jumps out of the guide jaws—form means for guiding the saw back into position within the jaws.

The fixed jaws 23 and 24 are integral with the support member 19 while the adjustable jaws 25 and 26 are integral with a carriage 29 movable within a guide-way 30 formed in support member 19. Member 19 is threaded to receive an adjustment screw 31 which regulates the location of the carriage by means of a shoulder 32 and a head 33 which engage opposite sides of a flange 34 formed on carriage 29. Carriage 29 is provided with an elongated slot 35 and is locked in adjusted position by means of a locking bolt 36 which lies within said slot and which is threaded through support member 19.

As, under certain conditions, it is desirable to lock the guide against swinging movement a lock pin 37 is provided. This is slidable through a bore formed in supporting yoke 7 and registers, when the saw guide jaws are in central position, with a hole formed in upper arm 14 as shown at 38. The pin may be locked in its different positions by means of a set screw 39.

Guide disk 30 consists of a hardened steel rim 40 having two wearing faces 41 and 42 of like contour. The annular web 43 of the wheel is bored to snugly fit the outer race 44 of a standard ball bearing consisting of the outer race, an inner race 45, a series of balls 46 and a spacer 47. The ball bearing may be of any standard or common type readily available in the market and may either be of the single row type as illustrated in the drawing or of any standard double row type. Spindle 21 is provided with a shoulder 48 and beyond the shoulder is turned to snugly fit the bore of the inner ball race. The guide wheel is rigidly held in place on the bearing by means of sheet metal covers 49 and 50 which are secured to the web 43 by small bolts 51 which pass through the covers and the web. Spindle 21 is bored out as shown at 52 to provide a grease pocket and this pocket together with the covers form a storage space for lubricant for the bearing. The covers 49 and 50 closely surround the inclosed parts and as they bear against the outer edges of the outer race serve to transmit end or side thrusts exerted by the saw upon the guide disk to the bearing. The ball bearing is of ample size and strength to readily withstand such end thrust. When one wear-face of the guide disk 20 becomes worn the other face may be substituted by merely removing bolts 51 and cover 49 and reversing the rim. The construction of this guide disk forms the subject matter of a copending application, Serial No. 326,476, and is not claimed herein.

In the case of the lower guide the jaws corresponding to jaws 24 and 26 are omitted as it is found that one set of jaws below the table is sufficient and the removal of the other set lessens the liability of clogging.

A shield 53 secured at 54 to jaw 23 extends part way around the guide wheel 20 in order to protect the operator while the device is in operation from collision with said wheel.

Having thus described my invention what I claim is—

1. In a saw guide, a pair of crossed arms pivoted to swing in planes at right angles to the path of movement of the saw, two pairs of saw embracing jaws carried by said arm, and a guide disk for the back of said saw extending between said pairs of jaws.

2. In a saw guide, the combination of crossed arms pivoted to swing in planes at right angles to the path of movement of a saw, two saw embracing pairs of jaws, a support for said jaws pivotally connected to the crossed arms and adapted to be oscillated by said arms and a guide wheel for the back of the saw mounted on said support and extending between said pairs of jaws.

3. In a saw guide, a stationary support provided with a pair of forwardly extending arms carrying vertical hinge pins rearwardly extending crossed arms pivotally mounted on said pins, and means carried by said support for locking said pivoted arms against movement.

4. In a saw guide, a stationary support provided with a pair of forwardly extending arms carrying vertical hinge pins, rearwardly extending crossed arms pivotally mounted on said pins, and means for locking said pivoted arms against movement.

5. In a saw guide, a stationary support provided with a pair of forwardly extending arms carrying vertical hinge pins, rearwardly extending crossed arms pivotally mounted on said pins, and a slidable lock pin carried by said support for engaging a socket in one of said crossed arms for locking said pivoted arms against movement.

In testimony whereof, I have hereunto subscribed my name this 31st day of Aug., 1918.

EDGAR NEWELL.